United States Patent [19]

Futakata et al.

[11] Patent Number: 5,490,078
[45] Date of Patent: Feb. 6, 1996

[54] ARTICLE FILE CONTROL SYSTEM

[75] Inventors: Takashi Futakata, Yokohama; Mitsuo Uchimura, Numazu; Masashi Suzuki, Mishima, all of Japan

[73] Assignee: Kabushiki Kaisha Tec, Shizuoka, Japan

[21] Appl. No.: 128,363

[22] Filed: Sep. 28, 1993

[51] Int. Cl.⁶ .................................................. G07G 1/14
[52] U.S. Cl. ............... 364/466; 340/870.01; 340/870.02; 364/404; 364/405
[58] Field of Search .................... 340/870.01, 870.02; 177/25.15; 364/404, 405, 464.02, 464.03, 464.01, 464.04, 466, 483

[56] References Cited

U.S. PATENT DOCUMENTS

| | | | |
|---|---|---|---|
| 3,906,208 | 9/1975 | Rogers | 177/25.15 X |
| 4,138,735 | 2/1979 | Allocca et al. | 364/567 X |
| 4,301,444 | 11/1981 | Bruckert et al. | 340/870 |
| 4,302,750 | 11/1981 | Wadhwani et al. | 340/870.02 |
| 4,398,253 | 8/1983 | Karp et al. | 364/466 |
| 4,468,750 | 8/1984 | Chamoff et al. | 364/405 X |
| 4,749,992 | 6/1988 | Fitzemeyer et al. | 340/870.02 |
| 4,879,650 | 11/1989 | Kurimoto et al. | 364/405 |
| 4,901,237 | 2/1990 | Hikita et al. | 364/464.01 |
| 4,936,693 | 6/1990 | Ohsawa | 364/466 X |
| 5,052,504 | 10/1991 | Ikeda et al. | 177/25.15 |
| 5,119,294 | 6/1992 | Tanaka | 364/405 |
| 5,153,585 | 10/1992 | Negishi et al. | 364/405 X |
| 5,237,507 | 8/1993 | Chasek | 364/464.04 |
| 5,245,534 | 9/1993 | Waterhouse et al. | 364/404 |
| 5,313,664 | 5/1994 | Sugiyama et al. | 364/405 |
| 5,335,171 | 8/1994 | Fuyama | 364/405 |
| 5,347,451 | 9/1994 | Fujiwara et al. | 364/405 |
| 5,382,779 | 1/1995 | Gupta | 364/464.01 X |
| 5,424,521 | 6/1995 | Wolfe, Jr. et al. | 364/405 X |

FOREIGN PATENT DOCUMENTS

5307697  11/1993  Japan.

*Primary Examiner*—Edward R. Cosimano
*Attorney, Agent, or Firm*—Frishauf, Holtz, Goodman, Langer & Chick

[57] ABSTRACT

An article file control system includes a host computer for controlling a master article file (which includes article data of various department articles including data items of article codes and unit prices), and a plurality of terminal groups provided for respective article departments. Each terminal group includes a first-type electronic weighing and pricing device (EWPD) for radio communication with the host computer and a second-type EWPD for wire communication with the first-type EWPD. The host computer includes a CPU for reading out article data of each department from the master article file and transmitting the article data to the first-type EWPD of a corresponding one of the terminal groups. The first-type EWPD of each of the terminal groups includes a CPU for receiving article data transmitted from the host computer, transmitting the article data to all of the second-type EWPDs of the same terminal group and controlling a department article file comprised of the received article data. The second-type EWPD of each of the terminal groups includes a CPU for receiving article data transmitted from the first-type EWPD of the same terminal group and controlling a department article file comprised of the received article data.

15 Claims, 5 Drawing Sheets

ARTICLE FILE CONTROL SYSTEM

BACKGROUND OF THE INVENTION

1. Field of the Invention

This invention relates to an article file control system for controlling article files in a large-scale retail shop, and more particularly to an article file control system in which an article file for articles of a single department is controlled at each sales counter.

2. Description of the Related Art

In a large-scale retail shop such as a super market, a plurality of electronic weighing and pricing devices (EWPDs) are arranged for respective sales counters of article departments of meat, fish, cheese and the like. Each of the EWPDs is used to measure the weight of a sales article and derives the price of the article by multiplying the measured weight by the unit price thereof for unit weight. The thus derived price is printed on a label together with the article name, unit price and weight thereof, for example, and attached to the sales article.

The conventional article file control system includes a host computer connected to a plurality of EWPDs via a communication cable. The host computer has a master article file comprising article data of various department articles including items such as article codes, department codes, article names and unit prices and supplies part of the various article data contained in the master article file to all of the EWPDs for each article department. Each of the EWPDs controls the article data of a single article department supplied from the host computer as a department article file and informs the host computer of sales data which is obtained as the result of the label issuing process effected based on the department article file. Further, when article data (for example, unit price) of an article is changed in the master article file, the article data is supplied as changed data to all of the EWPDs arranged in the sales counter dealing with the article and the changed data is stored into the department article file instead of the previous article data of the article.

The host computer transmits a request signal for requesting data reception to the EWPD, receives an acknowledge signal transmitted from the EWPD when the request is acknowledged, and transmits data after receiving the acknowledge signal. In the above bi-directional communication, it is impossible to simultaneously supply article data of articles from the host computer to all of the EWPDs arranged in the sales counter dealing with the articles. For this reason, the host computer sequentially supplies the article data to all of the EWPDs.

In the conventional article file controlling system, supply of the article data of common articles by the host computer must be repeatedly effected by a number of times corresponding to the number of EWPDs provided in the sales counter dealing with the articles. Further, the host computer is generally installed in an office lying at a far distance from the sales counters and the cost for installation and maintenance of the communication cable becomes high. When sales counters of a plurality of departments are re-arranged, the arrangement of the communication cable must be changed.

SUMMARY OF THE INVENTION

An object of this invention is to provide an article file control system in which the number of times for transmitting article data of the same article department and the cost for arrangement of the wiring and change of the arrangement of the wiring can be reduced.

The above object can be attained by an article file control system comprising a host computer for controlling a master article file comprising article data of various department articles including data items of article codes and unit prices; and a plurality of terminal groups provided for respective article departments and each including a first terminal for radio communication with the host computer and at least one second terminal for wire communication with the first terminal; wherein the host computer includes a control unit for reading out article data of each department from the master article file and transmitting the article data to the first terminal of a corresponding one of the terminal groups, the first terminal of each of the terminal groups includes a control unit for receiving article data transmitted from the host computer, transmitting the article data to all of the second terminals of the same terminal group and controlling a department article file constructed by the received article data, and the second terminal of each of the terminal groups includes a control unit for receiving article data transmitted from the first terminal of the same terminal group and controlling a department article file constructed by the received article data.

In the article file control system, the first terminal of each of the terminal groups receives article data of single article department transmitted from the host computer and transmits the article data to all of the second terminals of the same terminal group. Therefore, it is not necessary for the host computer to transmit article data of the same article department to the second terminal. Further, since radio communication is effected between the host computer and the first terminal of each of the terminal groups, the cost for arrangement of wiring and change of the arrangement of the wiring can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

There will now be described an article file control system according to an embodiment of this invention with reference to the accompanying drawings.

The article file control system is mainly arranged in a large-scale retail shop such as a super market for selling various kinds of articles. In the sales counters for article departments of meat, fish, cheese and the like, the weight of an article is measured and the price of the article is determined by multiplying the measured weight by a unit price thereof for the unit weight. The thus determined price is printed on a label together with the article name, unit price, weight thereof and time and date of issuance, and attached to the sales article.

Figure 1:
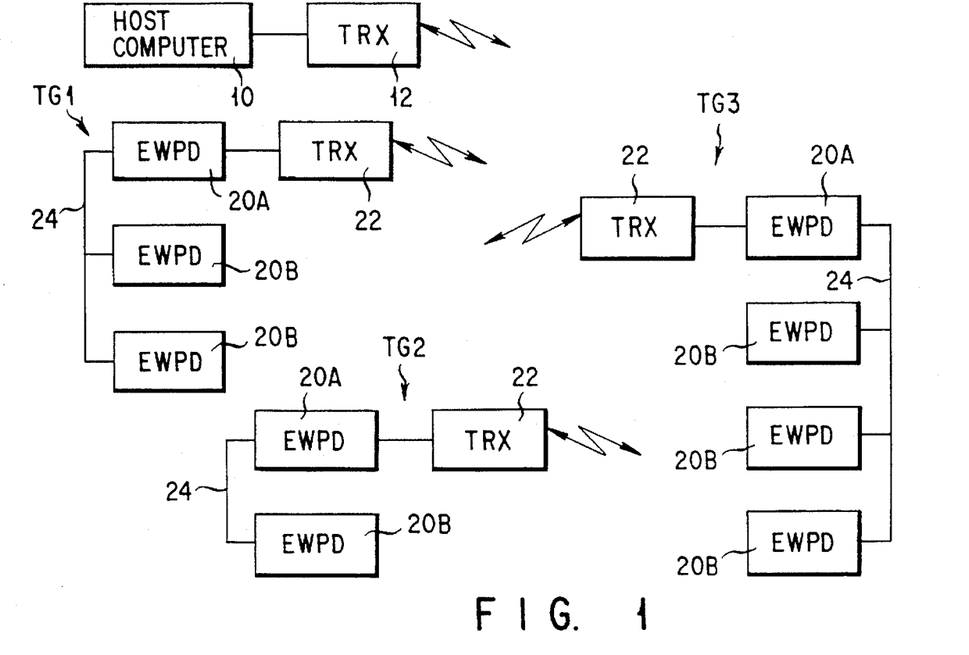
FIG. 1 is block diagram schematically showing the whole construction of an article file control system according to one embodiment of this invention.

FIG. 1 schematically shows the whole construction of an article file control system according to one embodiment of this invention. The article file control system includes a host computer 10 installed in an office, and terminal groups TG1, TG2 and TG3 arranged for the respective sales counters for meat, fish and cheese, for example. The host computer 10 has a master article file constructed by article data items of various department articles and controls the master article file. Part of the master article file, that is, article data of the meat department, article data of the fish department, and article data of the cheese department are supplied to the respective terminal groups TG1, TG2 and TG3. Each of the terminal groups TG1, TG2 and TG3 includes a first-type electronic weighing and pricing device (EWPD) 20A for controlling the article data of a corresponding single article department supplied from the host computer as a department article file and effecting the label issuing process based on the department article file and at least one second-type EWPD 20B for controlling the article data of a corresponding single article department supplied from the first-type EWPD 20A as a department article file and effecting the label issuing process based on the department article file. The article file control system further includes a radio communication device (TRX) 12 attached to the host computer 10 and radio communication devices (TRX) 22 attached to the respective first-type EWPDs 20A of the terminal groups TG1, TG2 and TG3. The host computer 10 transmits and receives data by use of the radio communication device 12 and the first-type EWPDs 20A of the terminal groups TG1, TG2 and TG3 transmit and receive data by use of the respective communication devices 22. That is, article data of the meat department, article data of the fish department and article data of the cheese department are supplied from the host computer 10 to the respective first-type EWPDs 20A of the terminal groups TG1, TG2 and TG3 by radio communication. In each of the terminal groups TG1, TG2 and TG3, the first-type EWPD 20A is connected to the second-type EWPD or EWPDs 20B via a communication cable 24 (for example, telephone line). In the terminal group TG1, article data of the meat department are supplied from the first-type EWPD 20A to two second-type EWPDs 20B by wire communication. In the terminal group TG2, article data of the fish department are supplied from the first-type EWPD 20A to one second-type EWPD 20B by wire communication. In the terminal group TG3, article data of the cheese department is supplied from the first-type EWPD 20A to three second-type EWPDs 20B by wire communication.

Figure 2:
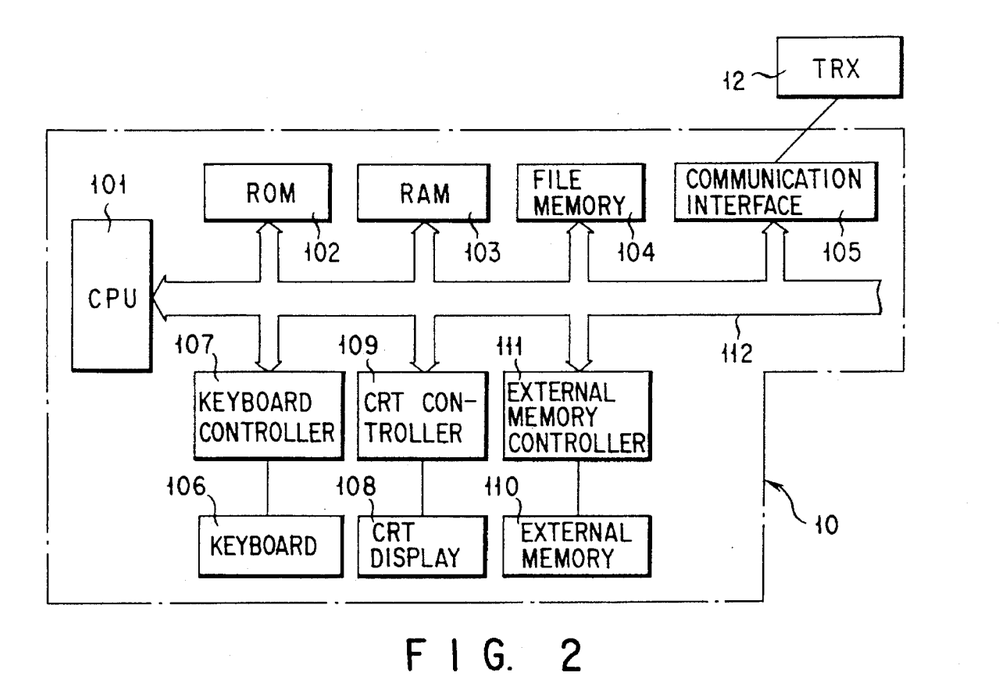
FIG. 2 a block diagram concretely showing the construction of a host computer shown in FIG. 1.

FIG. 2 shows the detailed construction of the host computer 10.

The host computer 10 includes a CPU 101, ROM 102, RAM 103, file memory 104, communication interface 105, keyboard 106, keyboard controller 107, CRT display 108, CRT controller 109, external memory device 110, external memory device controller 111, and system bus 112. The CPU 101 is connected to the ROM 102, RAM 103, file memory 104, communication interface 105, keyboard controller 107, CRT controller 109, external memory device controller 111 via the system bus 112. The CPU 101 performs various control processes containing the control process for the master article file according to a control program. The ROM 102 stores the control program to be executed by the CPU 101. The RAM 103 temporarily stores data input to and output from the CPU 101. The file memory 104 stores the master article file controlled by the CPU 101. The communication interface 105 is connected to the radio communication device 12 for effecting the radio communication and serves as an interface for the radio communication device 12 with respect to the CPU 101. The keyboard controller 107 is connected to the keyboard 106 for inputting various instructions and data and controls the operation of the keyboard 106. The CRT controller 109 is connected to the CRT display 108 for displaying various data and controls the operation of the CRT display 108. The external memory device controller 111 is connected to the external memory device 110 for storing data input to and output from the CPU 101 and the control program of the CPU 101 and controls the operation of the external memory device 110.

Figure 3:
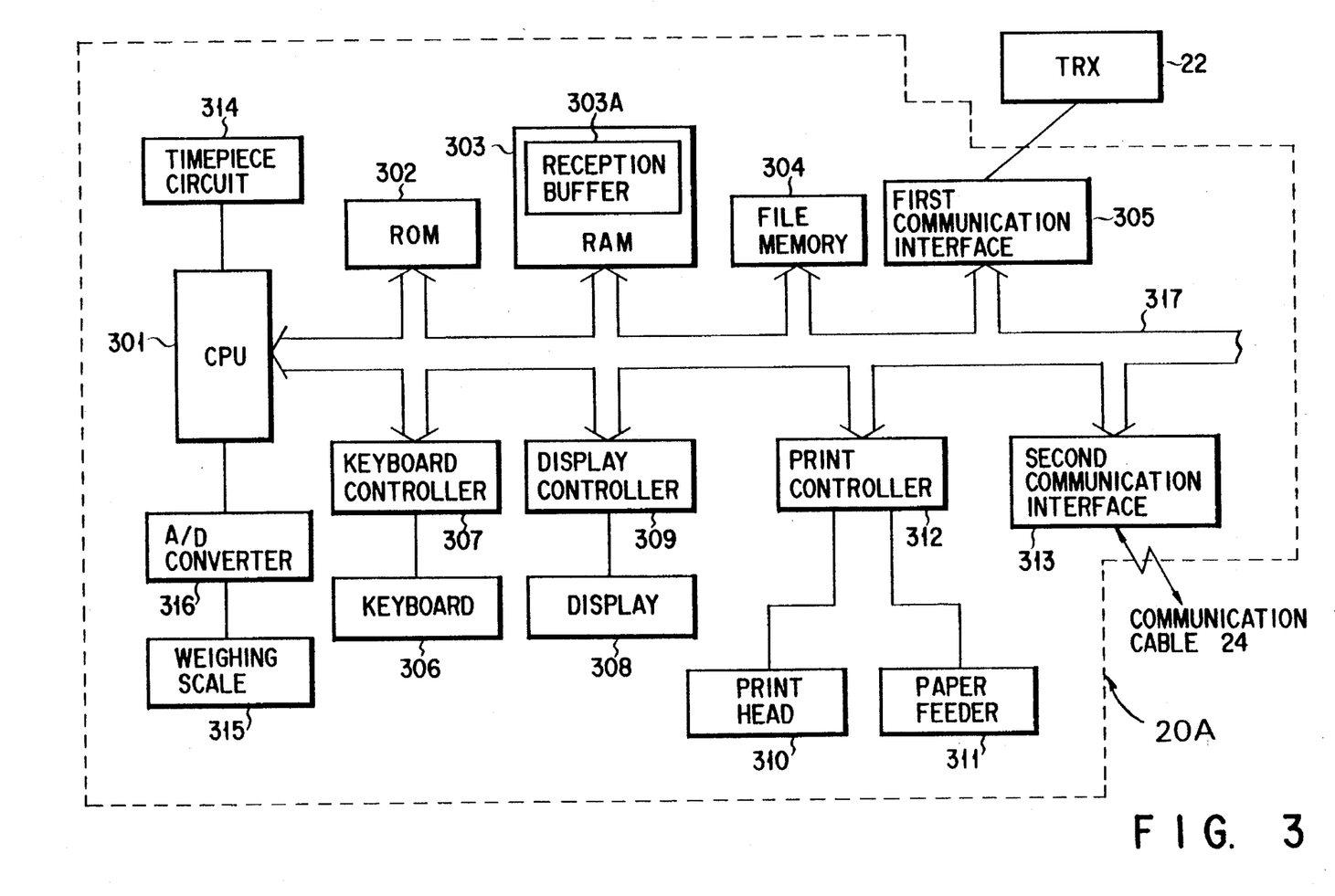
FIG. 3 is a block diagram concretely showing the construction of an EWPD shown in FIG. 1.

FIG. 3 shows the detailed construction of the first-type EWPD 20A. The second-type EWPD 20B has the same construction as the first-type EWPD 20A except that the radio communication device is not connected thereto.

The first-type EWPD 20A includes a CPU 301, ROM 302, RAM 303, file memory 304, first communication interface 305, keyboard 306, keyboard controller 307, display 308, display controller 309, print head 310, paper feeder 311, print controller 312, second communication interface 313, timepiece circuit 314, weighing scale 315, A/D converter 316, and system bus 317. The CPU 301 is connected to the ROM 302, RAM 303, file memory 304, first communication interface 305, keyboard controller 307, display controller 309, print controller 312, second communication controller 313, and A/D converter 316 via the system bus 317. The CPU 301 performs various control processes including a process of measuring the weight of an article, deriving the price of the article by multiplying the measured weight by the unit price thereof for the unit weight and printing the thus derived price on a label together with article data such as the article code, department code, article name, and time and date data. The ROM 302 stores the control program to be executed by the CPU 301. The RAM 303 temporarily stores data input to and output from the CPU 301. A reception buffer 303A is provided in the RAM 303 to temporarily store data which is received via the first and second communication interfaces 305, 313. The file memory 304 stores article data supplied via the first communication interface 305 as a department article file. The CPU 301 is further directly connected to the timepiece circuit 314 and A/D converter 316. The A/D converter 316 is connected to the weighing scale 315. The timepiece circuit 314 supplies time and date data indicating current time and date to the CPU 301. The weighing scale 315 measures the weight of an article and supplies an analog signal representing the measured weight to the A/D converter 316. The A/D converter 316 converts the analog signal supplied from the weighing scale 315 into a digital signal and supplies the same to the CPU 301. The keyboard controller 307 is connected to the keyboard 306 for inputting various instructions and data and controls the operation of the keyboard 306. The display controller 309 is connected to the display 308 for displaying the article name, unit price, weight, price and others of the article whose weight is measured and controls the operation of the display 308. The print controller 312 is connected to the print head 310 for printing the article name, unit price, weight, price and others of the article whose weight is measured on a label and connected to the paper feeder 311 for supplying label paper to the print head 310 and controls the operations of the print head 310 and paper feeder 311. For example, the paper feeder 311 feeds the label paper by rotation of a motor. The first communication interface 305 is connected to the radio communication device 22 for effecting the radio communication and serves as an interface between the radio communication device 22 and the CPU 301. The second communication interface 313 is connected to the wire communication device 24 for effecting the wire communication and serves as an interface between the wire communication device 24 and the CPU 301. The CPU 301 effects the operation for the first-type EWPD 20A when it detects at the time of turn-ON of the power source switch that the radio communication device 22 is connected to the first communication interface 24. If the connection is not detected, the CPU 301 effects the operation for the second-type EWPD 20B.

Figure 4:
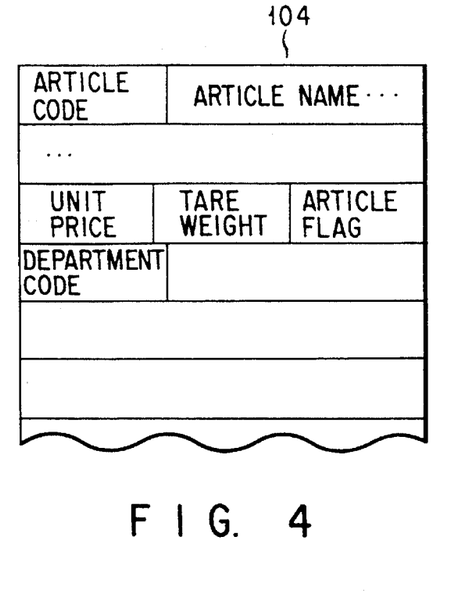
FIG. 4 is a diagram showing the construction of a file memory shown in FIG. 2.
Figure 5:
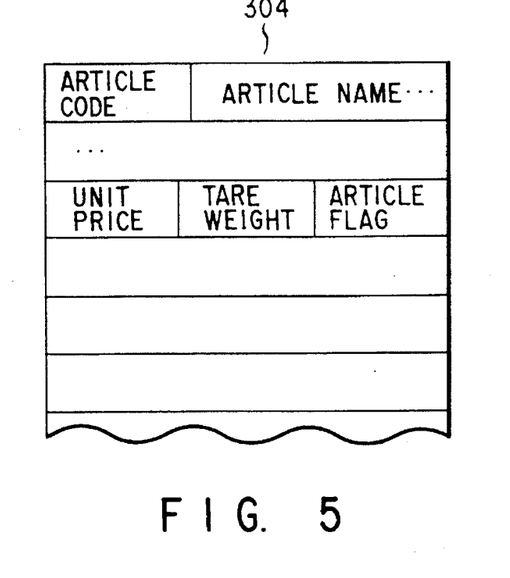
FIG. 5 is a diagram showing the construction of a file memory shown in FIG. 3.

FIG. 4 shows the file memory 104 for storing the master article file in the host computer 10. In the master article file, each article data item includes items such as an article code, article name, unit price, tare weight, article flag, and department code and the data items are stored in the file memory 104 as shown in FIG. 4. The article data items are read out from the file memory 104 for each article department and supplied to the respective EWPDs 20A of the terminal groups TG1, TG2 and TG3. FIG. 5 shows the file memory 304 for storing the department article file in each of the EWPDs 20A. In the department article file, each article data item includes items such as an article code, article name, unit price, tare weight, article flag and sales data and the data items except the department code are stored in the file memory 304 as shown in FIG. 5. Sales data is attached to each article data as the result of the label issuing process effected based on the article data. The sales data is read out from the file memory 304 according to a request from the host computer 10 and supplied to the host computer 10. The tare weight is an item for indicating the weight of the tray or the like of wrapping an article and is used to derive the net weight of the article by subtracting the tare weight from the measured gross weight. The article flag is an item indicating that the price is dependent on the weight of the article and the unit price is multiplied by the net weight of the article when the article flag is set.

Now, the operation of the article file control system is explained.

The host computer 10 sequentially radio-transmits part of the master article file, that is, article data of meat department, article data of fish department and article data of cheese department to the respective EWPDs 20A of the terminal groups TG1, TG2 and TG3. In each of the terminal groups TG1, TG2 and TG3, the EWPD 20A receives article data of single article department transmitted from the host computer 10 and controls the article data as the department article file. Further, it wire-transmits the article data to the second-type EWPD 20B. The second-type EWPD 20B receives article data transmitted from the first-type EWPD 20A and controls the article data as the department article file. Each of the first- and second-type EWPDs 20A and 20B selects the article data of a weighed article in the corresponding department article file and issues a label according to the article data. Sales data obtained as the result of the above process is stored in the first- and second-type EWPDs 20A and 20B and transmitted to the host computer 10 if required. That is, sales data obtained in the first-type EWPD 20A is directly transmitted by radio to the host computer 10. On the other hand, sales data obtained in the second-type EWPD 20B is directly transmitted by wire to the first-type EWPD 20A and is transmitted by radio from the first-type EWPD 20A to the host computer 10.

Figure 6:
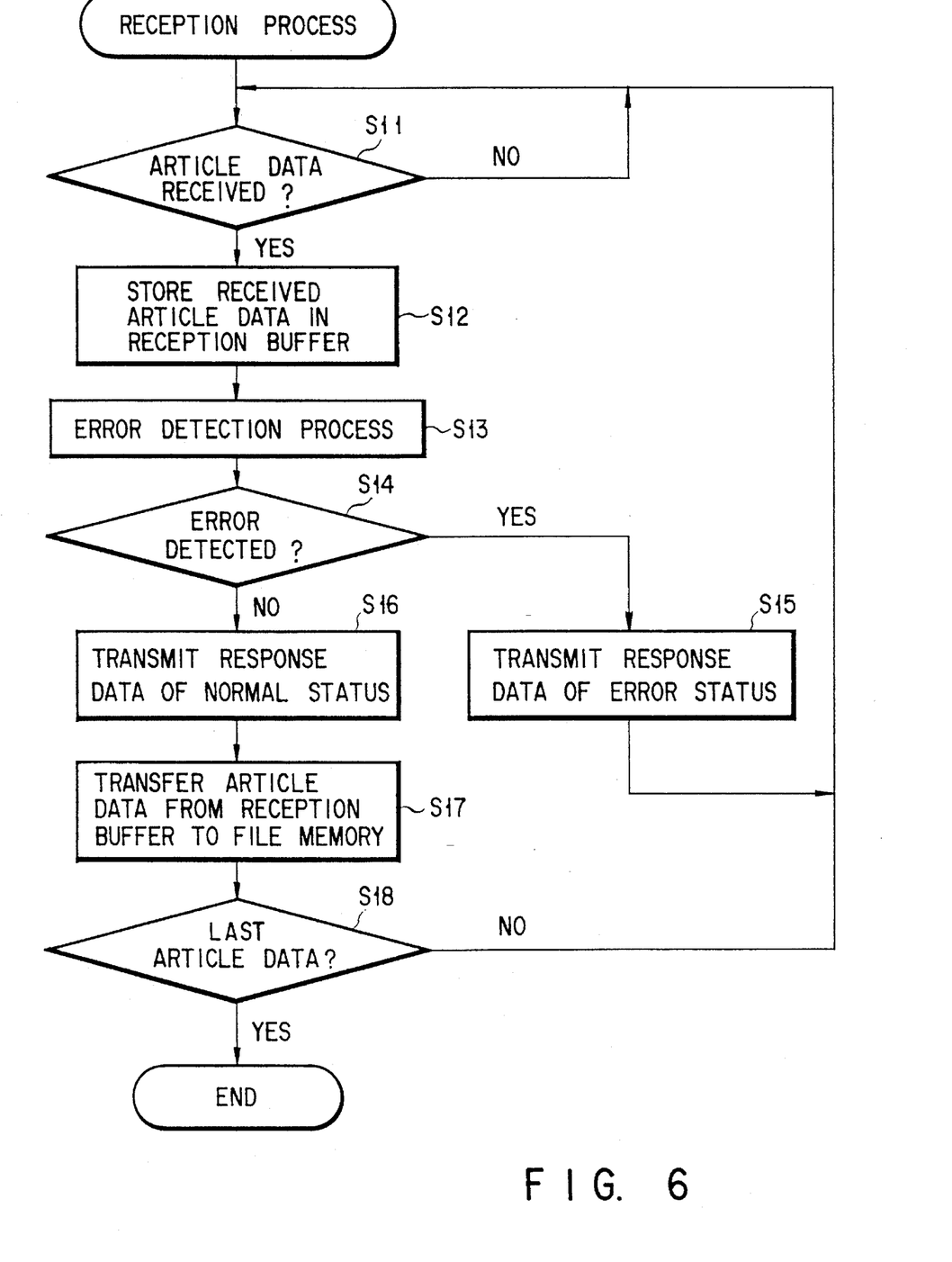
FIG. 6 is a flowchart for illustrating the reception process of an EWPD for receiving article data transmitted by radio from the host computer shown in FIG. 1.

FIG. 6 shows the reception process of the first-type EWPD 20A for receiving article data transmitted by radio from the host computer 10. The reception process is started when a reception request from the host computer 10 is acknowledged. In the reception process, the CPU 301 repeatedly checks in the step S11 whether article data of a corresponding article department is received or not, stores received article data in the reception buffer 303A in the step S12, and effects the error detection process for the article data stored in the reception buffer 303A in the step S13 (for example, when the horizontal parity check is effected as the error detection process, parity data is attached to to-be-transmitted article data). In the next step S14, the result of the error detection process is checked. If an error is detected, response data indicating the abnormal status is transmitted by radio to the host computer 10 in the step S15 and then the step S11 is effected again. Upon receipt of the response data, the host computer 10 transmits article data in which the error has occurred, again. On the other hand, when no error is detected, response data indicating the normal status is transmitted by radio to the host computer 10 in the step S16 and article data stored in the reception buffer 303A is transferred to the file memory 304 in the step S17. In the next step S18, whether reception article data is the last article data or not is checked. When it is detected that the article data is not the last article data, the step S11 is effected to receive next article data. If it is detected that the article data is the last article data, the reception process is completed.

Figure 7:
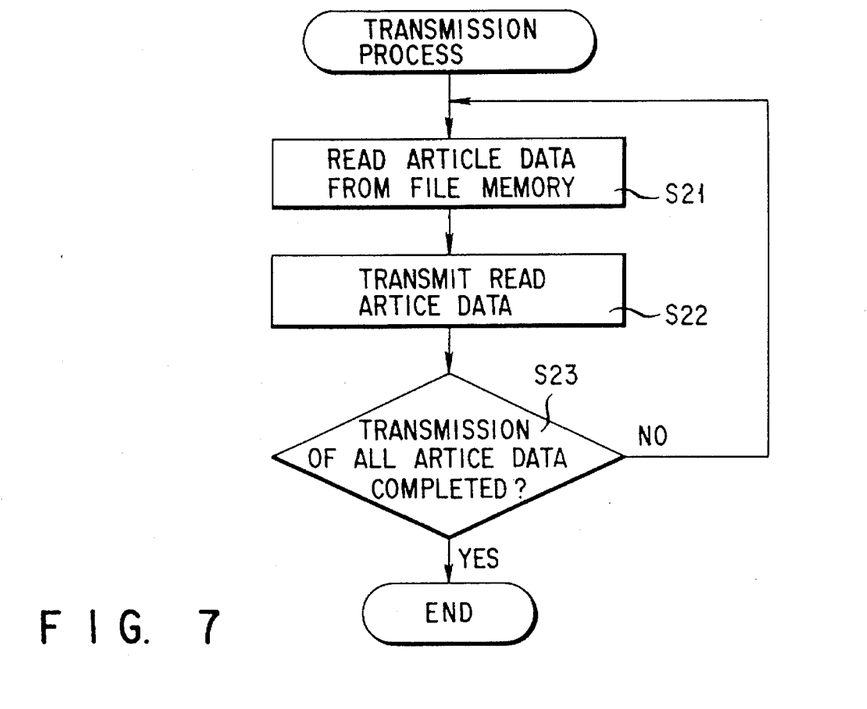
FIG. 7 is a flowchart for illustrating the transmission process of a first-type EWPD for transmitting article data received in the reception process shown in FIG. 6 to a second-type EPWD by use of wiring.

FIG. 7 shows the transmission process of the first-type EWPD 20A for wire-transmitting article data received in the above reception process to the second-type EWPD 20B. When the transmission process is started, the CPU 301 reads out article data from the file memory 304 in the step S21 and transmits the article data to each of the second-type EWPDs 20B via the communication cable 24 in the step S22. In the next step S23, whether all of the article data items stored in the file memory 304 are transmitted or not is checked. If it is detected that all of the article data items are not transmitted, the step S21 is effected again to transmit next article data. If it is detected that all of the article data items are transmitted, the transmission process is completed.

Figure 8:
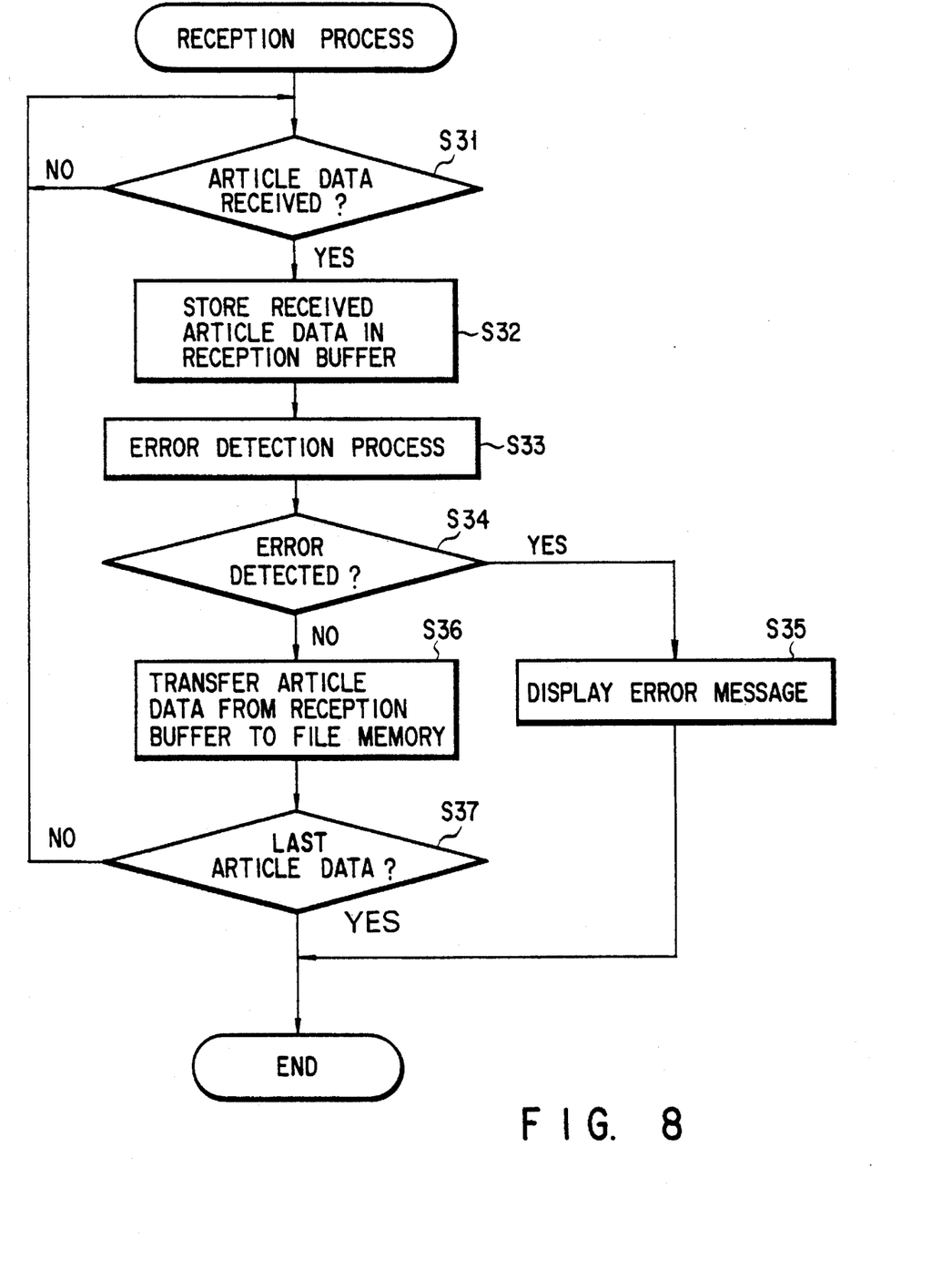
FIG. 8 is a flowchart for illustrating the reception process of the second-type EWPD 20B for receiving article data transmitted in the transmission process shown in FIG. 7 by use of wiring.

FIG. 8 shows the reception process of the second-type EWPD 20B for receiving article data transmitted by wire from the first-type EWPD 20A. The reception process is started when a reception request from the first-type EWPD 20A is acknowledged. In the reception process, the CPU 301 repeatedly checks in the step S31 whether article data of a corresponding article department is received or not, stores the received article data into the reception buffer 303A in the step S32, and effects the error detection process for the article data stored in the reception buffer 303A in the step S33 (for example, when the horizontal parity check is effected as the error detection process, parity data is attached to to-be-transmitted article data). In the next step S34, the result of the error detection process is checked. If an error is detected, the error is displayed on the display 308 in the step S35 and the reception process is completed. If no error is detected, article data stored in the reception buffer 303A is transferred into the file memory 304 in the step S36. In the next step S37, whether the received article data is the last article data or not is checked. If it is detected that it is not the last article data, the step S31 is effected to receive next article data. If it is detected that it is the last article data, the reception process is completed.

In the article file control system of the above embodiment, the host computer 10 is installed in the office room of a super market to control the master article file comprised of article data items for various articles, a plurality of EWPDs 20A and 20B are arranged in the respective sales counters of different article departments such as meat, fish and cheese to issue article labels, the radio communication devices 12, 22 for mutual radio-communication are respectively attached to the host computer 10 and one of the plurality of EWPDs 20A and 20B arranged in the respective sales counters, that is, the first-type EWPD 20A, and the communication cable 24 is connected between the first-type EWPD 20A and all of the second-type EWPDs 20B for mutual wire-communication in the same sales counter. The host computer 10 reads out article data contained in the master article file for each article department and supplies the article data to the first-type EWPD 20A arranged in a corresponding sales counter by radio communication. The first-type EWPD 20A controls the article data supplied from the host computer 10 as the department article file, and supplies the article data to all of the second-type EWPDs 20B arranged in the same sales counter by wire communication. The second-type EWPD 20B controls the article data supplied from the first-type EWPD 20A as the department article file. The first-type EWPD 20A effects the article label issuing process based on the department article file and directly supplies the result of the process to the host computer 10 by radio communication. On the other hand, the second-type EWPD 20B effects the article label issuing process based on the department article file, wire-transmits the result of the process to the first-type EWPD 20A, and supplies the same to the host computer 10 by radio-transmitting the result of the process from the first-type EWPD 20A.

That is, the host computer 10 sets the department article file only for the first-type EWPD 20A of each sales counter and the first-type EWPD 20A sets the department article file for the second-type EWPD or EWPDs 20B. Since the host computer 10 is not required to repeatedly effect the operation of setting the department article file by a number of times corresponding to the number of the second-type EWPDs 20B, the time required for the host computer 10 to set the department article file can be reduced.

Further, since it is not necessary to connect the communication cable between the host computer 10 and the first-type EWPD 20A of each sales counter and the first- and second-type EWPDs 20A and 20B in each sales counter can be interconnected by use of a communication cable such as a telephone line which is relatively inexpensive, the cost for installation of the wire can be reduced. When sales counters of a plurality of departments are re-arranged, the cost for the wiring changing work is not necessary for a portion between the host computer 10 and the first-type EWPD 20A.

In the above embodiment, the EWPDs 20A, 20B are used as examples of terminals for controlling article data of single article department supplied from the host computer 10 as the department article file. Therefore, they can be modified to have a function of an electronic cash register or can be replaced with electronic cash registers having no weighing function.

Additional advantages and modifications will readily occur to those skilled in the art. Therefore, the invention in its broader aspects is not limited to the specific details an representative devices, shown and described herein. Accordingly, various modifications may be made without departing from the spirit or scope of the general inventive concept as defined by the appended claims and their equivalents.

What is claimed is:

1. An article file control system comprising:

a host computer which controls a master article file, which master article file includes items of article data for articles of various different departments; and a plurality of terminal groups, each terminal group including a first-type terminal for radio communication with said host computer and at least one second-type terminal for wire communication with said first-type terminal, each of the first- and second-type terminals controlling a department article file comprised of items of article data for articles of only a single department;

and wherein:

said host computer includes control means for reading out article data items for articles of each department from said master article file and for transmitting the article data items to the first-type terminal of a terminal group corresponding to the department to which the article data items pertain, said first-type terminal of each terminal group includes control means for receiving article data items for a single respective department from said host computer, for setting the received article data items in the department article file, and for transmitting the received article data items to said at least one second-type terminal of a same terminal group, and said at least one second-type terminal of each terminal group includes control means for receiving article data items transmitted from the first-type terminal of the same terminal group, and for setting the received article data items in the department article file.

2. An article file control system according to claim 1, wherein the control means of each terminal includes:

a file memory for storing the department article file; and a processor for effecting a processing for articles of one department based on the department article file.

3. An article file control system according to claim 2, wherein:

said host computer includes means for, when an article data item for an article is changed in said master article file, transmitting the article data item as a changed data item to the first-type terminal of a terminal group corresponding to the department of said article;

the first-type terminal of each terminal group includes means for receiving a changed data item transmitted from said host computer, for transmitting the changed data item to said at least one second-type terminal of the same terminal group, and for replacing a corresponding article data item with the changed data item in the department article file stored in the file memory thereof; and the second-type terminal of each terminal group includes means for receiving a changed data item transmitted from the first-type terminal of the same terminal group, and for replacing a corresponding article data item with the changed data item in the department article file stored in the file memory thereof.

4. An article file control system according to claim 2, wherein the processor of each terminal includes attaching means for attaching result data items obtained by said processing to the article data items for the articles in the department article file stored in said file memory.

5. An article file control system according to claim 4, wherein:

the second-type terminal of each terminal group includes means for transmitting the result data items attached to the article data items in the department article file stored in the file memory thereof to the first type terminal of the same terminal group; and the first-type terminal of each terminal group includes means for transmitting the result data items attached to the article data items in the department article file stored in the file memory thereof and the result data transmitted form each second-type terminal of the same terminal group to said host computer.

6. An article file control system according to claim 1, wherein:

the first-type terminal of each terminal group and said host computer include respective radio communication devices for effecting radio communication therebetween; and the first- and second-type terminals of each terminal group are interconnected via a communication cable to effect wire communication therebetween.

7. An article file control system according to claim 6, wherein the control means of each terminal includes:

a file memory for storing the department article file; and a processor for effecting a processing for articles of one department based on the department article file.

8. An article file control system according to claim 7, wherein:

said host computer includes means for, when an article data item for an article is changed in said master article file, transmitting the article data item as a changed data item to the first-type terminal of a terminal group corresponding to the department of said article;

the first-type terminal of each terminal group includes means for receiving a changed data item transmitted from said host computer, for transmitting the changed data item to said at least one second-type terminal of the same terminal group, and for replacing a corresponding article data item with the changed data item in the department article file stored in the file memory thereof; and the second-type terminal of each terminal group includes means for receiving a changed data item transmitted from the first-type terminal of the same terminal group, and for replacing a corresponding article data item with the changed data item in the department article file stored in the file memory thereof.

9. An article file control system according to claim 7, wherein the processor of each terminal includes attaching means for attaching result data items obtained by said processing to the article data items for the articles in the department article file stored in said file memory.

10. An article file control system according to claim 9, wherein:

the second-type terminal of each terminal group includes means for transmitting the result data items attached to the article data items in the department article file stored in the file memory thereof to the first type terminal of the same terminal group; and the first-type terminal of each terminal group includes means for transmitting the result data items attached to the article data items in the department article file stored in the file memory thereof and the result data transmitted form each second-type terminal of the same terminal group to said host computer.

11. An article file control terminal comprising:

a first interface for a radio communication device attachable thereto to effect radio communication with a host computer;

a second interface for a communication cable connected thereto to effect wire communication with another article file control terminal;

a file memory which stores a department article file comprised of items of article data for articles of only one of a number of different departments, each article data item representing at least an article code and a unit price; and control means for selectably affecting:

a first process of receiving an article data item for an article of said one department from said first interface, for setting the article data item in the department article file stored in said file memory for articles of said one department, for transmitting the article data item from said second interface to said another article file control terminal, and for controlling the department article file stored in said file memory, and a second process of receiving an article data item for an article of said one department from said second interface, for setting the article data item in the department article file stored in said file memory of said on department, and for controlling the department article file stored in said file memory of said one department.

12. An article file control terminal according to claim 11, further comprising:

weighing means for measuring a weight of an article; and wherein said control means further includes determining means for deriving a unit price from the article data set in said department article file for the article whose weight is measured, and for determining the price of the article by multiplying the unit price and the measured weight.

13. An article file control terminal according to claim 12, further comprising a display device which displays at least the weight and price of the article whose weight is measured.

14. An article file control terminal according to claim 12, further comprising a printer for issuing a label on which at least the weight and price of the article whose weight is measured are printed.

15. An article file control terminal according to claim 14 further comprising a display device which displays at least the weight and price of the article whose weight is measured.

* * * * *

UNITED STATES PATENT AND TRADEMARK OFFICE
CERTIFICATE OF CORRECTION

PATENT NO. : 5,490,078
DATED      : February 6, 1996
INVENTOR(S) : FUTAKATA et al.

It is certified that error appears in the above-indentified patent and that said Letters Patent is hereby corrected as shown below:

Title Page, Item [73] Assignee, "Tec" should be --TEC--

Signed and Sealed this

Third Day of September, 1996

*Attest:*

BRUCE LEHMAN

*Attesting Officer*     Commissioner of Patents and Trademarks